United States Patent [19]

Challberg et al.

[11] Patent Number: 5,183,627
[45] Date of Patent: Feb. 2, 1993

[54] NUCLEAR REACTOR WITH LOW-LEVEL CORE COOLANT INTAKE

[75] Inventors: Roy C. Challberg, Livermore; Harold E. Townsend, Campbell, both of Calif.

[73] Assignee: General Electric Company, San Jose, Calif.

[21] Appl. No.: 798,789

[22] Filed: Nov. 27, 1991

[51] Int. Cl.$^5$ .............................................. G21C 15/00
[52] U.S. Cl. .................................... 376/352; 376/353; 376/377
[58] Field of Search ................. 376/352, 353, 254, 377

[56] References Cited

U.S. PATENT DOCUMENTS 3,888,732  6/1975  Berglund et al. ................... 376/352

Primary Examiner—Donald P. Walsh
Assistant Examiner—Frederick H. Voss
Attorney, Agent, or Firm—Robert R. Schroeder

[57] ABSTRACT

A natural-circulation boiling-water reactor has skirts extending downward from control rod guide tubes to about 10 centimeters from the reactor vessel bottom. The skirts define annular channels about control rod drive housings that extend through the reactor vessel bottom. Recirculating water is forced in through the low-level entrances to these channels, sweeping bottom water into the channels in the process. The sweeping action prevents cooler water from accumulating at the bottom. This in turn minimizes thermal shock to bottom-dwelling components as would occur when accumulated cool water is swept away and suddenly replaced by warmer water.

5 Claims, 3 Drawing Sheets

NUCLEAR REACTOR WITH LOW-LEVEL CORE COOLANT INTAKE

BACKGROUND OF THE INVENTION

The Government has rights in this invention under Contract DE-AC03-90SF18494.

The present invention relates to nuclear reactors and, more particularly, to a nuclear reactor with improved coolant circulation. A major objective of the present invention is to minimize thermal stresses on bottom-dwelling reactor components.

In a natural-circulation boiling-water reactor (NCBWR), a chimney above the reactor core supports a driving head that promotes convection of water that transfers heat from the reactor core. In a conventional NCBWR, water flows up through the core and chimney, outward toward an annular downcomer, and radially inward, and upward into the core. Access to the core can be provided through openings near the tops of control rod guide tubes and/or directly from a lower plenum through the core plate.

NCBWR core water flow is very low during two conditions: at start up; and during "hot standby" when the main steam isolation valves are closed, shutting off the flow of steam to the condenser. When water flow is low, there is little mixing of the relatively cool water that, due to its greater density, collects at the bottom of the reactor vessel, where it can be bypassed by the recirculation flow. This problem is exacerbated by cold water entering at the bottom of the vessel as purge flow through the control rod drives.

At some point as reactor power is increased, the pool of cooler water can be suddenly swept away from the vessel bottom. As a result, components and welds at the vessel bottom can be thermally stressed, reducing their longevity. The affected components include control rod drive housings, the welds coupling these to stub tubes that penetrate the vessel bottom, the stub tubes themselves, and the welds attaching the stub tubes to the vessel bottom. What is needed is a reactor that minimizes thermal stresses, preferably by minimizing coolant stratification at the bottom of the reactor vessel.

SUMMARY OF THE INVENTION

In accordance with the present invention, a reactor provides channels that draw coolant from the reactor bottom into the core. The channels can be defined by skirts that extend down from control rod guide tubes to form sleeves over control rod drive housings. Between the skirts and housings are the coolant channels with annular cross sections. Channel entrances are within 25 centimeters (cm) of the vessel bottom and preferably at about 10 cm from the vessel bottom. At least 80% of the coolant, which is water in the case of a boiling-water reactor, entering the core enters through these channels.

The skirts can be welded at the bottom of the control rod drive tubes. The control rod guide tubes have bottom openings to admit coolant from the channels. Internal barriers within the guide tubes isolate from the control rods at least 80% of the coolant flow through the guide tubes.

The channels draw coolant from near the vessel bottom, preferentially drawing cooler water. This minimizes thermal stratification, even at minimum coolant flow. Thus, during a power surge, e.g., that can occur as power rises through the 15% level, any thermal shock at the bottom is minimal. The invention also provides improvements for forced-circulation boiling-water reactors during their start up. These and other features and advantages of the present invention are apparent from the description below with reference to the following drawings.

DESCRIPTION OF THE PREFERRED EMBODIMENTS

Figure 1:
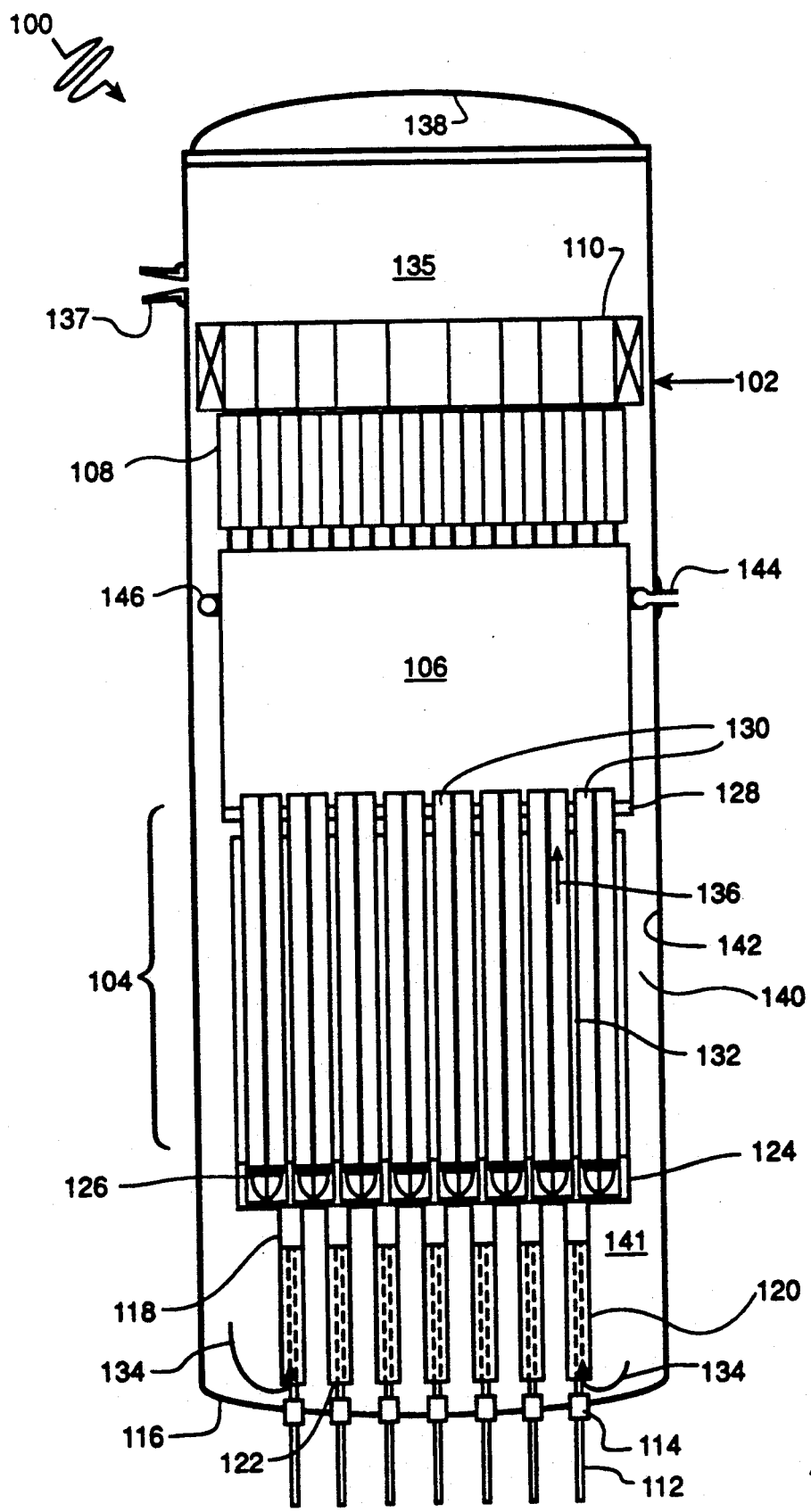
FIG. 1 is a schematic sectional view of a reactor in accordance with the present invention.

In accordance with the present invention, a boiling-water reactor 100 comprises a vessel 102, a core 104, a chimney 106, a steam separator 108, and a dryer 110. Control rod drive (CRD) housings 112 extend through stub tubes 114 at the bottom 116 of vessel 102 and support control rod guide tubes (CRGTs) 118. CRGTs 118 extend up to the bottom of core 104 so that control blades therein can be inserted into and retracted from core 104 to control its power output. Skirts 120 extend downward from CRGTs 118 to define channels 122 external to CRD housings 112.

Core 104 is bounded from below by a core plate 124, along with associated orificed core support pieces 126, and bounded from above by a top guide 128. These structures support and aid in the installation of fuel bundles 130 that provide the energy used to generate heat within core 104. Spaces 132 are left between groups of four fuel bundles to admit control rods with cruciform cross sections. Vertical movement of control rods is used to regulate power output.

Water flows, as indicated by arrows 134, into channels 122 from below. This subcooled water rises between skirts 120 and CRD housings 112, into CRGTs 118, into core 104. Water in core 104 is boiled to yield a water/steam mixture which rises through core 104 and chimney 106, as indicated by an arrow 136. Steam separator 108 helps separate steam from water, and the released steam exits through a stem exit 137 near the top 138 of vessel 102. Before exiting, any remaining water entrained in the steam is removed by dryer 110.

Water is returned down a peripheral downcomer 140 by the force of the driving steam head provided by chimney 106. Downcomer 140 is radially between a sidewall 142 of vessel 102 to the outside and core 104 and chimney 106 to the inside. Feedwater enters vessel 102 through a feedwater inlet nozzle 144 and a feedwater sparger 146 to replenish and to subcool the recirculating water in downcomer 140. Water in downcomer 140 flows into lower plenum 141 and toward vessel bottom 116, sweeping water that might otherwise stratify near bottom 116 up into channels 122. Core plate 124 is about 3 meters above the lowest internal point of bottom 116, while the lowest points of skirts 120 are about 10 cm above the same bottom level.

Figure 2:
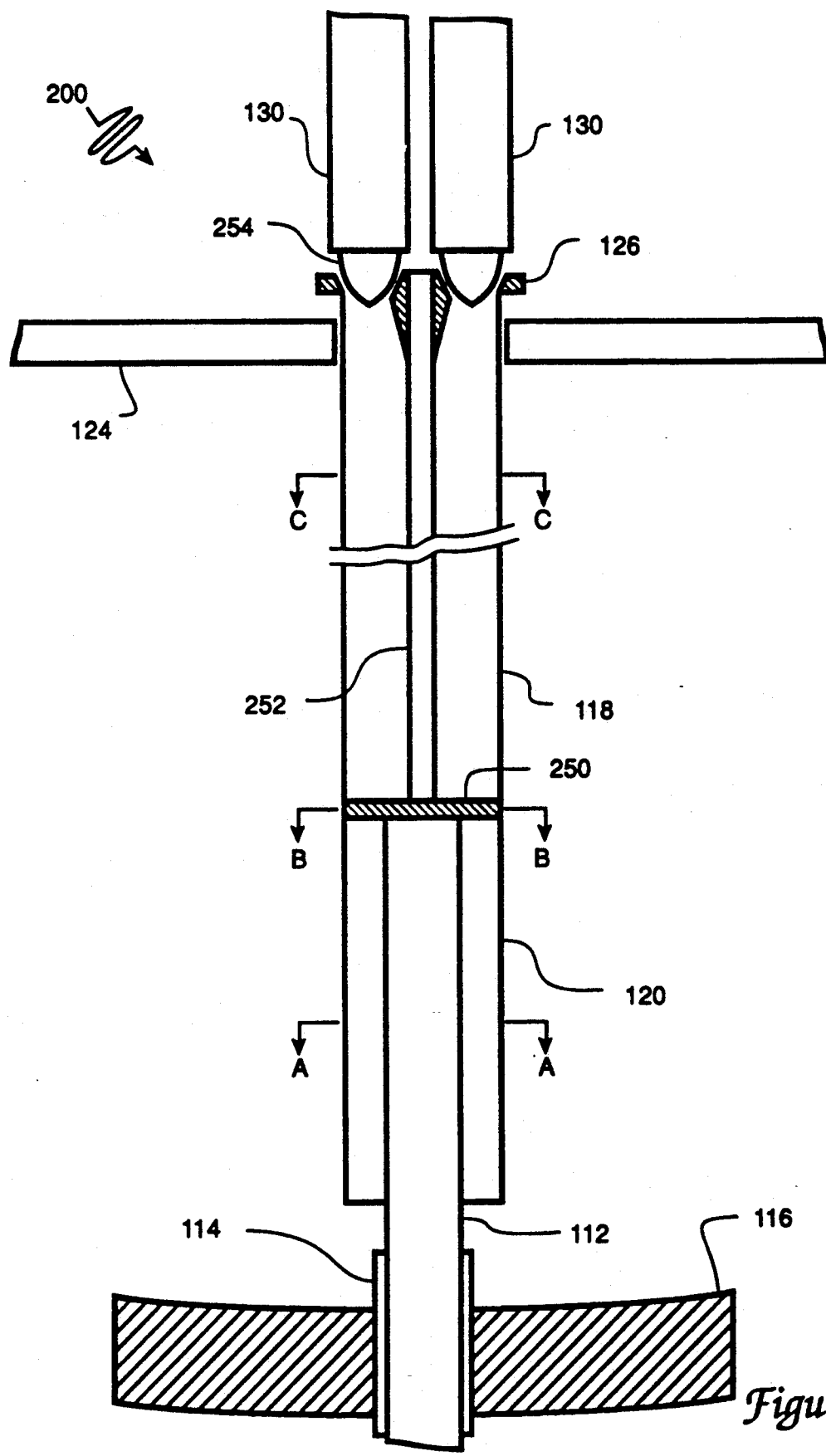
FIG. 2 is a schematic sectional view of an assembly of control rod related components of the reactor of FIG. 1.

An assembly 200 of a CRD housing 112, a CRGT 118, and a skirt 120 is shown in greater detail in FIG. 2. A base 250 of CGRT 118 is fitted onto the top of CRD housing 112. Skirt 120 is shown extending downward from base 250. A barrier 252 isolates flow along a control rod from that flowing outside barrier 252 but within CRGT 118. A core support piece 126 is positioned at the top of CRGT 118 and shown supporting bottom tie plates 254 of fuel bundles 130.

Figure 3A:
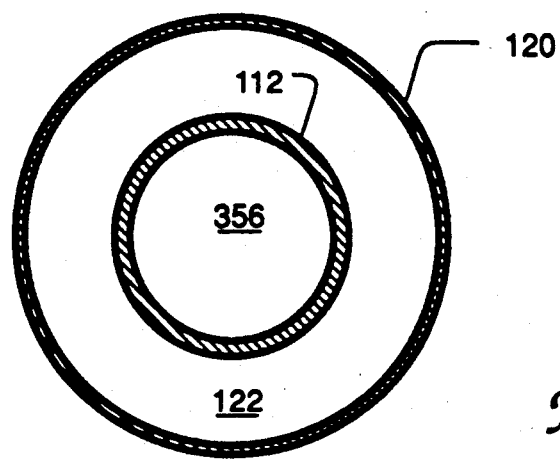
FIGS. 3A, 3B, and 3C are sectional views taken respectively through a control rod drive housing, a base of a control rod drive housing, and the control rod drive housing, all of FIG. 2.
Figure 3B:
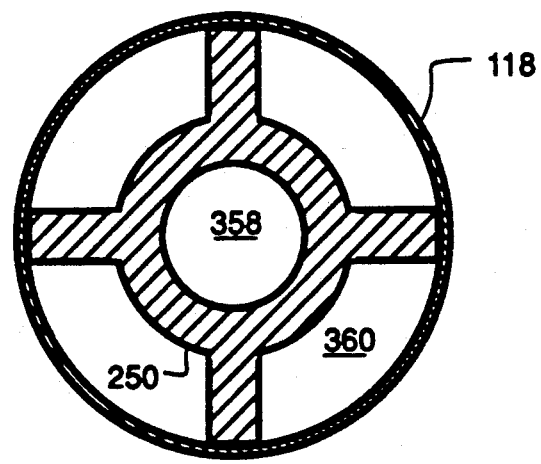

As illustrated in FIG. 3A, each channel has an annular cross section, the inner diameter of which is defined by the respective CRD housing 112, and the outer diameter of which is defined by the respective skirt 120. CRD housing 112 defines a circular channel 356 for accommodating a control rod drive. As illustrated in FIG. 3B, each CRGT base 250 includes a central aperture 358 through which a control rod drive can be coupled with a control rod. Base 250 also defines four outer apertures 360 through which coolant in channel 122 enters CRGT 118.

Figure 3C:
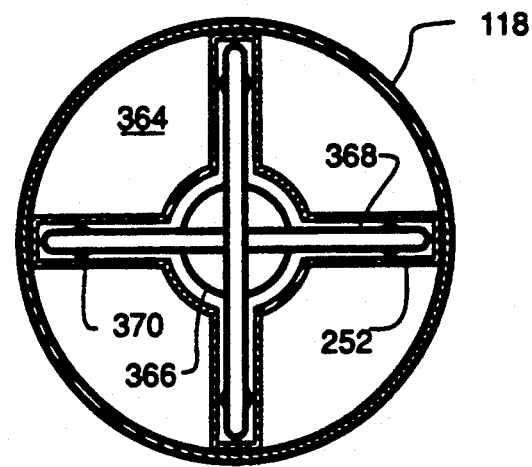

As shown in FIG. 3C, barrier 252 has a cruciform cross section that extends vertically over at least most of the height of CRGT 118. This barrier 252 defines four CRGT channels 364, the coolant entrances to which are the four outer apertures 360 defined by base 250, FIG. 3B. Barrier 252 effectively isolates a control rod 366 extending vertically through the center of CRGT 118, FIG. 3C. The cruciform cross section of barrier 252 accommodates the blades 368 of control rod 366. Blades 368 have rollers 370 to facilitate vertical movement of control rod 366 relative to barrier 252 and fuel bundles 130. Coolant in each CRGT channel 364 is guided to a respective fuel bundle 130, FIG. 1. As is known in the art, provision can be made for cross flow between channels 364 and the interior of barrier 252.

The present invention provides for alternatives to the above-described embodiment. For example, provision for side-entry of coolant into channels 122 can be made, as long as the side entry level is sufficiently near bottom 116. Additional flow paths into core 104 can be provided as long as at least 80% of the core flow enters annular channels 122 within 25 cm of bottom 116. The present invention applies to both natural— and forced— circulation boiling— water reactors. These and other modificatons to and variations upon the described embodiments are provided by the present invention, the scope of which is limited only by the following claims.

We claim:

1. A reactor comprising:
   a reactor vessel having a bottom, a sidewall, and a top;
   a core within said reactor vessel;
   control rod guide tubes for guiding vertical movement of controls rods relative to said core;
   control rod drive housings extending between said vessel bottom and respective ones of said control rod guide tubes; and
   channel means for defining annular channels about said control rod drive housings, said channels having entrances within 25 centimeters of said vessel bottom and having exits providing for fluid communication with said control rod guide tubes.

2. A reactor as recited in claim 1 wherein said channel means includes tubes welded to said control rod guide tubes.

3. A reactor as recited in claim 1 wherein said entrances are within 10 centimeters of said bottom.

4. A reactor as recited in claim 1 wherein at least 80% of the coolant entering said core flow through said entrances.

5. A reactor as recited in claim 1 wherein said control rod guide tubes include barriers so that at least 80% of the coolant flowing through said control rod guide tubes is isolated from said control rod.

* * * * *